United States Patent [19]

Weder et al.

[11] Patent Number: 5,314,398
[45] Date of Patent: * May 24, 1994

[54] FLOWER POT OR FLOWER POT COVER WITH BASE HAVING OVERLAPPING FOLD SOME OF WHICH ARE CONNECTED AND SOME OF WHICH ARE UNCONNECTED

[75] Inventors: Donald E. Weder; Joseph G. Straeter, both of Highland, Ill.

[73] Assignee: Highland Supply Corporation, Highland, Ill.

[*] Notice: The portion of the term of this patent subsequent to Jul. 20, 2010 has been disclaimed.

[21] Appl. No.: 937,570

[22] Filed: Aug. 31, 1992

Related U.S. Application Data

[63] Continuation of Ser. No. 701,390, May 16, 1991, which is a continuation-in-part of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ .............................................. A01G 9/02
[52] U.S. Cl. ...................................... 493/121; 47/72; 493/154
[58] Field of Search ............................ 47/72; 229/4.5; 493/154, 155, 167, 121

[56] References Cited

U.S. PATENT DOCUMENTS

| | | | |
|---|---|---|---|
| D. 293,774 | 1/1988 | Weder | 47/72 |
| 2,367,749 | 1/1945 | Barbieri | 493/154 |
| 2,967,652 | 1/1961 | Canfield | 47/72 |
| 4,733,521 | 3/1988 | Weder | 47/72 |
| 4,773,182 | 9/1988 | Weder | 47/72 |

Primary Examiner—Henry E. Raduazo
Attorney, Agent, or Firm—Dunlap, Codding & Lee

[57] ABSTRACT

A flower pot or flower pot cover comprising a base and a skirt connected to an upper end of the base. The base includes a plurality of overlapping folds for providing structural integrity. The base is divided into a plurality of segments with each segment extending generally between the upper and the lower end of the base and each segment extending a distance circumferentially about the base. The overlapping folds in some of the segments are connected and the overlapping folds in the remaining segments are unconnected to provide an overall pleated appearance.

4 Claims, 1 Drawing Sheet

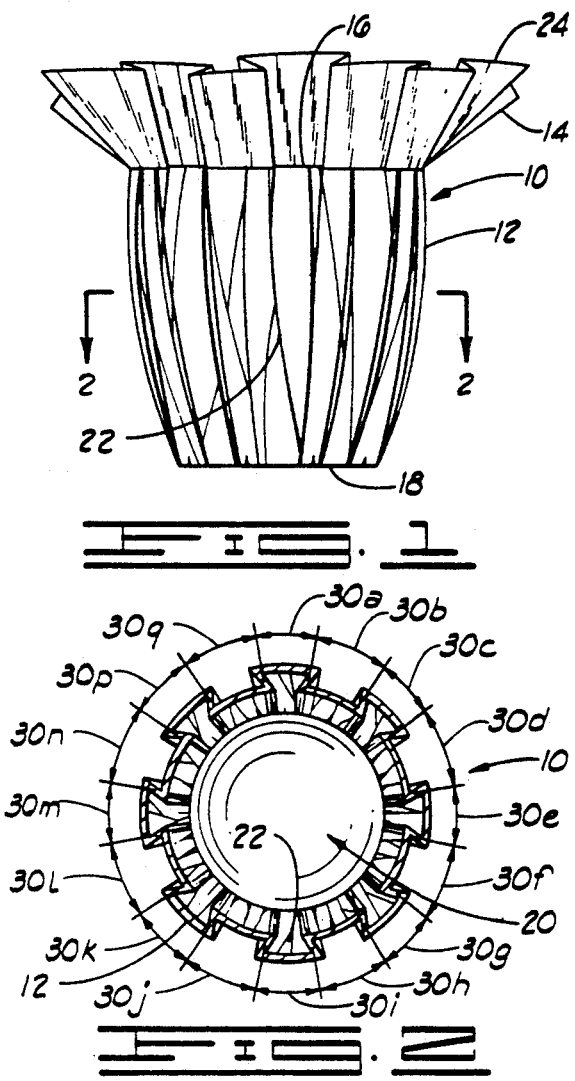
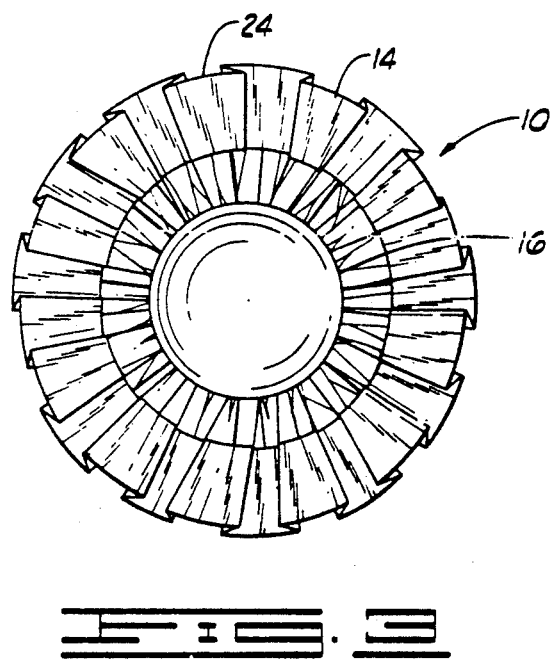

FLOWER POT OR FLOWER POT COVER WITH BASE HAVING OVERLAPPING FOLD SOME OF WHICH ARE CONNECTED AND SOME OF WHICH ARE UNCONNECTED

CROSS-REFERENCE TO RELATED APPLICATION

This application is a continuation of U.S. Ser. No. 07/701,390, filed: May 16, 1991, entitled "FLOWER POT OR FLOWER POT COVER WITH BASE HAVING OVERLAPPING FOLD SOME OF WHICH ARE CONNECTED AND SOME OF WHICH ARE UNCONNECTED, which is a continuation-in-part of U.S. Ser. No. 397,114, filed Aug. 22, 1989, now U.S. Pat. No. 5,029,412, issued Jul. 9, 1991, which is a continuation-in-part of U.S. Ser. No. 366,588, filed Jun. 15, 1989, now U.S. Pat. No. 5,111,613, issued May 12, 1992, which is a continuation-in-part of U.S. Ser. No. 219,083, filed Jul. 13, 1988, now U.S. Pat. No. 4,897,031, issued Jan. 30, 1990, which is a continuation of U.S. Ser. No. 004,275, filed Jan. 5, 1987, now U.S. Pat. No. 4,773,182, issued Sep. 27, 1988, which is a continuation of U.S. Ser. No. 613,080, filed May 22, 1984, now abandoned.

FIELD OF THE INVENTION

The present invention relates to flower pot covers or flower pots having a skirt and a base with folds in the base wherein the folds in the base are selectively connected.

BRIEF DESCRIPTION OF THE DRAWINGS

FIG. 1 is a side elevational view of a flower pot or flower pot cover constructed in accordance with the present invention.

FIG. 2 is a sectional view of the flower pot or flower pot cover of FIG. 1, taken substantially along the lines 2—2 of FIG. 1.

FIG. 3 is a top elevational view of the flower pot or flower pot cover of FIG. 1.

DESCRIPTION OF THE PREFERRED EMBODIMENTS

Shown in FIGS. 1, 2 and 3 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 12 (FIGS. 1 and 2) and a skirt 14 (FIGS. 1 and 3).

The base 12 has an upper end 16 (FIGS. 1 and 3) and a lower end 18 (FIG. 1). An object opening 20 (FIG. 2) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIGS. 1 and 2) which extend at various angles and which have different and various lengths. At least some of the overlapping folds 22 are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds 22.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polyproplyene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by Glad ®, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

The base 12 is divided into a plurality of segments with each of the segments 30 with the respective individual segments being designated in FIG. 2 by the individual reference numerals 30a, 30b, 30c, 30d, 30e, 30f, 30g, 30h, 30i, 30j, 30k, 30l, 30m, 30n, 30p, 30q. Each of the segments 30 defines an area of the base extending between the upper end 16 and the lower end 18 of the base 12. Each of the segments 30 extends a distance circumferentially about the base 12. The overlapping folds 22 in the segments 30a, 30c, 30e, 30g, 30i, 30k, 30m and 30p are unconnected forming unconnected segments 30. The overlapping folds 22 in the segments 30b, 30d, 30f, 30h, 30j, 30l, 30n and 30q are connected and sealed forming connected segments. Each unconnected segment is disposed generally between two of the connected segments for forming pleats extending generally between the upper and the lower ends 16 and 18 of the base 12.

What is claimed is:

1. A method for making a flower pot or flower pot cover comprising:
    forming a base having an upper end and a lower end with an object opening extending through the upper end of the base by forming a plurality of overlapping folds in said base extending at various angles and having different and various lengths;
    dividing some base into a plurality of segments with each segment defining an area extending between the upper and lower end of the base and with each segment defining a circumferential distance about the base;
    designating some of said segments as connected segments and some of said segments as unconnected segments; and
    connecting the folds in the connected segments only.

2. The method of claim 1 wherein the step of connecting the overlapping folds as defined further as connecting some of the overlapping folds in the base whereby each unconnected segment is disposed between two connected segments.

3. The method of claim 1 wherein the step of forming the base is defined further as forming the base constructed of a material selected from a group of materials consisting of a man-made organic polymer film, paper (treated or untreated or combinations thereof), burlap, cloth (natural or synthetic or combinations thereof), denim, foil, cling wrap or cellophane or combinations thereof.

4. The method of claim 1 further comprising:
    forming a skirt on the base with the skirt extending a distance from the upper end of the base.

* * * * *

UNITED STATES PATENT AND TRADEMARK OFFICE
CERTIFICATE OF CORRECTION

PATENT NO. : 5,314,398
DATED : May 24, 1994
INVENTOR(S) : Weder et al.

It is certified that error appears in the above-identified patent and that said Letters Patent is hereby corrected as shown below:

On the title page, Item [63],"Related U.S. Application Data", line 1, after the year "1991,", please insert --Pat. No. 5,288,236--.

Column 1, line    under the section "CROSS-REFERENCE TO RELATED APPLICATION", after "UNCONNECTED,", please insert --now U.S. Pat. No. 5,288,236, issued Jul. 20, 1993--.

Column 4, line 9, please delete "some", and substitute therefore the word --said--.

Signed and Sealed this

Twenty-seventh Day of September, 1994

Attest:

BRUCE LEHMAN

Attesting Officer

Commissioner of Patents and Trademarks